United States Patent Office 3,257,221
Patented June 21, 1966

3,257,221
METHOD OF PREPARING ZIRCONIUM SILICATE CERAMIC STAINS
John Kenneth Olby, Surbiton, England, assignor to Associated Lead Manufacturers Limited, London, England, a British company
No Drawing. Filed May 7, 1963, Ser. No. 278,781
Claims priority, application Great Britain, May 11, 1962, 18,275/62
6 Claims. (Cl. 106—299)

Stains which will produce colours when incorporated in a ceramic glaze have been made by incorporating various colour producing elements, notably vanadium, in the zirconium silicate lattice of the product obtained by calcination of zirconia, silica and an alkali metal halide such as sodium fluoride.

When cobalt is included in such a stain in place of vanadium and as cobalt oxide the resulting stain imparts a blue colour to the glaze and cobalt cannot be extracted from the stain by treatment with hydrochloric acid to an extent sufficient to remove the blue colour. It is probable that part of the cobalt enters the zircon lattice in the trivalent state and that the blue colour imparted to the glaze is due to the further presence in the stain of cobalt oxide not actually in the zircon lattice.

It has hitherto been necessary, in order to produce a grey ceramic glaze which is stable at high temperatures, to incorporate in the glaze a mixture of different colour stains. The present invention provides a stain which, without admixture with other stains, will impart a grey colour to the glaze.

The stain according to the invention is produced by incorporating cobalt in the powdered mixture to be calcined in the form of a cobalt halide or sulphate and leaching the calcined stain with hydrochloric acid.

Hydrochloric acid leaching of the product prior to its incorporation in a glaze gives a good grey colour. The grey colour appears to be due to trivalent cobalt incorporated in the zircon lattice. The cobalt may be incorporated in the mix as the chloride, fluoride or sulphate. Preferably the amount of silica in the mixture is the stoichiometric quantity for complete reaction with the zirconia to form zirconium silicate. The mixture includes a small quantity of alkali metal halide to catalyse the formation of zirconium silicate.

It is necessary that the calcination should be effected at a temperature between 650° and 1150° C. On calcination at a temperature of 550° C. no zirconium silicate lattice is formed, while on calcination at a temperature of 1200° C. cobalt silicate is formed and the stain confers a blue colour and not a grey colour.

The following are the proportions in which the constituents should be incorporated in the mixture subjected to calcination:

$SiO_2$—30–80%, and preferably 48.7%, by weight of the zirconia.
Alkali metal halide 1–15% by weight of the zirconia.
$CoCl_2.6H_2O$—1–80% by weight of the zirconia.
$CoF_2.4H_2O$—0.50–50% by weight of the zirconia.
$CoSO_4.7H_2O$—1–80% by weight of the zirconia.

The following are examples of the production of typical stains in accordance with the invention. In each case the mix is calcined over 3 hours to the temperature stated and maintained at this temperature for 1 hour. The product is then ground to pass a sieve of 40 mesh B.S.S., extracted for several hours with hot concentrated hydrochloric acid, washed and dried.

Examples

| | | | | | |
|---|---|---|---|---|---|
| $ZrO_2$ | 10 g. | 10 g. | 10 g. | 10 g. | 10 g. |
| $SiO_2$ | 4.96 g. | 4.96 g. | 4.96 g. | 4.96 g. | 4.96 g. |
| NaF | 0.36 g. | 0.36 g. | 0.36 g. | 0.36 g. | 0.36 g. |
| $CoCl_2.6H_2O$ | 1.0 g. | 5.0 g. | 5.0 g. | | |
| Calcination Temperature | 950° C. | 950° C. | 850° C. | 950° C. | 950° C. |
| Glaze Colour | palish grey. | good grey. | very good grey. | palish grey. | palish grey. |
| $CoSO_4.7H_2O$ | | | | 1 g. | |
| $CoF_2.4H_2O$ | | | | | 1 g. |

| | | | | | |
|---|---|---|---|---|---|
| $ZrO_2$ | 10 g. | 10 g. | 10 g. | 10 g. | 10 g. |
| $SiO_2$ | 8 g. | 4 g. | 2.5 g. | 4.96 g. | 4.96 g. |
| NaF | 0.36 g. | 0.36 g. | 0.36 g. | 0.18 g. | 1.0 g. |
| $CoCl_2.6H_2O$ | 1.0 g. | 1.0 g. | 1.0 g. | 5.0 g. | 5.0 g. |
| Calcination Temperature | 950° C. | 950° C. | 950° C. | 950° C. | 950° C. |
| Glaze Colour | very pale grey. | pale grey. | pale blue/grey. | palish slightly bluish/grey. | grey. |

What I claim as my invention and desire to secure by Letters Patent is:

1. A method of preparing a ceramic stain which will confer a grey colour on a ceramic glaze, which method comprises calcining at a temperature between 650° and 1150° C. a mixture of zirconia, silica in an amount of 30–80% by weight of the zirconia, an alkali metal halide in an amount of 1–15% by weight of the zirconia and a cobalt salt selected from the group consisting of cobalt halides and cobalt sulphate in an amount of 0.50–80% by weight of the zirconia and leaching the calcined product with hydrochloric acid.

2. A method as claimed in claim 1 in which the mixture subjected to calcination contains cobalt as $$CoCl_2.6H_2O$$

in an amount of 1–80% by weight of the zirconia.

3. A method as claimed in claim 1, in which the mixture subjected to calcination contains cobalt as $CoF_2.4H_2O$ in an amount of 0.50–50% by weight of the zirconia.

4. A method as claimed in claim 1, in which the mixture subjected to calcination contains cobalt as $CoSO_4.7H_2O$ in an amount of 1–80% by weight of the zirconia.

5. A method as claimed in claim 1 in which the mixture subjected to calcination contains silica in an amount of 48.7% by weight of the zirconia.

6. A ceramic stain when manufactured by the method claimed in claim 1.

References Cited by the Examiner
UNITED STATES PATENTS
2,438,335    3/1948    Earl _____ 106—299
FOREIGN PATENTS
384,473    12/1932    Great Britain.

TOBIAS E. LEVOW, *Primary Examiner.*
J. POER, *Assistant Examiner.*